US010723906B2

(12) United States Patent
Lock et al.

(10) Patent No.: US 10,723,906 B2
(45) Date of Patent: Jul. 28, 2020

(54) COATING COMPOSITION FOR A FOOD OR BEVERAGE CAN

(71) Applicant: PPG Industries Ohio, Inc., Cleveland, OH (US)

(72) Inventors: Kam Lock, London (GB); Laudine Ducrocq, Gonfreville-l'Orcher (FR); Jean-Luc Maral, Gonfreville-l'Orcher (FR); Gregory Smets, Gonfreville-l'Orcher (FR)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/362,046

(22) PCT Filed: Dec. 3, 2012

(86) PCT No.: PCT/EP2012/074229
§ 371 (c)(1),
(2) Date: Aug. 28, 2014

(87) PCT Pub. No.: WO2013/079719
PCT Pub. Date: Jun. 6, 2013

(65) Prior Publication Data
US 2014/0323641 A1 Oct. 30, 2014

(30) Foreign Application Priority Data
Dec. 2, 2011 (EP) .................................... 11191799

(51) Int. Cl.
*B65D 17/32* (2006.01)
*B65D 41/32* (2006.01)
*B65D 1/12* (2006.01)
*C09D 133/02* (2006.01)
*C09D 133/06* (2006.01)
*C09D 7/63* (2018.01)
*C08K 5/5435* (2006.01)
*C08K 5/544* (2006.01)

(52) U.S. Cl.
CPC ............ *C09D 133/02* (2013.01); *C09D 7/63* (2018.01); *C09D 133/06* (2013.01); *C08K 5/544* (2013.01); *C08K 5/5435* (2013.01)

(58) Field of Classification Search
None
See application file for complete search history.

(56) References Cited

U.S. PATENT DOCUMENTS

| | | | | |
|---|---|---|---|---|
| 2,017,460 A | * | 10/1935 | Hothersall | B65D 17/161 220/266 |
| 2,324,078 A | * | 7/1943 | Gray | C09D 127/06 525/143 |
| 2,741,397 A | * | 4/1956 | Shotton | C09D 191/005 220/62.12 |
| 3,117,693 A | * | 1/1964 | Vogel | B05D 7/16 206/456 |
| 3,134,682 A | * | 5/1964 | Vogel | B65D 25/14 106/404 |
| 3,191,564 A | * | 6/1965 | Fraze | B21D 51/383 220/273 |
| 3,191,797 A | * | 6/1965 | Fraze | B21D 51/383 220/273 |
| 3,198,155 A | * | 8/1965 | Fraze | B21D 39/031 220/270 |
| 3,251,515 A | * | 5/1966 | Henchert | B65D 17/16 220/270 |
| 3,251,793 A | * | 5/1966 | Vogel | B65D 7/04 428/35.8 |
| 3,302,818 A | * | 2/1967 | Balocca | B65D 17/505 220/231 |
| 3,339,789 A | * | 9/1967 | Stolle | B21D 51/383 220/270 |
| 3,347,700 A | * | 10/1967 | Vogel | C08F 20/56 220/62.12 |
| 3,349,949 A | * | 10/1967 | Brown | B65D 17/165 220/273 |
| 3,397,811 A | * | 8/1968 | Lipske | B65D 17/165 220/273 |
| 3,434,623 A | * | 3/1969 | Cookson | B21D 51/383 220/270 |
| 3,507,418 A | * | 4/1970 | Saunders | B21D 51/383 220/270 |
| 3,525,455 A | * | 8/1970 | Saunders | B65D 7/36 220/619 |
| 3,551,517 A | * | 12/1970 | Christenson | C08G 59/04 273/DIG. 3 |
| 3,632,461 A | * | 1/1972 | Gayner | B21D 51/383 156/257 |
| 3,688,718 A | * | 9/1972 | Schrecker | B21D 51/383 413/12 |
| 3,696,961 A | * | 10/1972 | Holk, Jr. | B21D 51/383 220/269 |
| 3,705,563 A | * | 12/1972 | Elser | B21D 51/383 413/13 |
| 3,735,894 A | * | 5/1973 | Kinkel | B65D 17/24 220/270 |
| 3,744,668 A | * | 7/1973 | Bartels | B65D 17/163 220/266 |
| 3,753,847 A | * | 8/1973 | Gayner et al. | B21D 51/383 220/266 |
| 3,754,678 A | * | 8/1973 | Fox | B65D 17/163 220/270 |

(Continued)

FOREIGN PATENT DOCUMENTS

EP 0985718 A2 3/2000
EP 1546273 6/2005

(Continued)

*Primary Examiner* — Peter A Salamon
(74) *Attorney, Agent, or Firm* — Diane R. Meyers

(57) ABSTRACT

A food or beverage can post repair coating composition comprising
an acrylic latex material.

10 Claims, No Drawings

(56) References Cited

U.S. PATENT DOCUMENTS

| | | | | |
|---|---|---|---|---|
| 3,765,352 A * | 10/1973 | Schubert | B21D 51/383 | 413/13 |
| 3,859,113 A * | 1/1975 | Horvath | B05B 13/0278 | 118/315 |
| 3,861,976 A * | 1/1975 | Gayner | B21D 51/383 | 156/257 |
| 3,871,314 A * | 3/1975 | Stargell | B21D 51/383 | 413/13 |
| 3,936,557 A * | 2/1976 | Watt | B41N 1/003 | 427/552 |
| 3,954,075 A * | 5/1976 | Jordan | B21D 51/383 | 220/266 |
| 3,960,979 A * | 6/1976 | Khanna | C09D 163/00 | 525/110 |
| 3,990,376 A * | 11/1976 | Schubert | B21D 51/383 | 413/13 |
| 4,016,311 A * | 4/1977 | Ellerbrock | B65D 17/163 | 264/135 |
| 4,018,848 A * | 4/1977 | Khanna | C09D 163/00 | 525/109 |
| 4,052,949 A * | 10/1977 | Woodley | B21D 51/383 | 413/13 |
| 4,081,344 A * | 3/1978 | Shindou | C25D 13/18 | 204/477 |
| 4,212,781 A * | 7/1980 | Evans | C08F 283/10 | 428/418 |
| 4,216,736 A * | 8/1980 | Westphal | B21D 51/383 | 413/12 |
| 4,342,674 A * | 8/1982 | Morgan | C08G 59/145 | 428/418 |
| 4,403,003 A * | 9/1983 | Backhouse | C09D 5/02 | 427/407.1 |
| 4,455,114 A * | 6/1984 | Zysset | B65D 17/163 | 413/14 |
| 4,465,204 A * | 8/1984 | Kaminski | B65D 17/165 | 220/269 |
| 4,530,631 A * | 7/1985 | Kaminski | B65D 17/165 | 413/12 |
| 4,596,843 A * | 6/1986 | Wind | C08G 59/687 | 523/402 |
| 4,634,508 A | 1/1987 | Hoefling et al. | | |
| 4,683,273 A * | 7/1987 | Bode | C09D 151/08 | 523/412 |
| 4,685,849 A * | 8/1987 | LaBarge | B21D 51/383 | 220/240 |
| 4,690,835 A * | 9/1987 | Halabisky | B65D 5/067 | 427/210 |
| 4,739,020 A * | 4/1988 | Carson | C08G 18/4027 | 525/481 |
| 4,752,172 A * | 6/1988 | Bolte | C25D 13/22 | 118/423 |
| 4,842,887 A * | 6/1989 | Bolte | B05D 7/16 | 118/324 |
| 4,908,153 A * | 3/1990 | Kossmann | C25D 13/12 | 118/426 |
| 5,043,380 A * | 8/1991 | Cole | C09D 133/066 | 524/510 |
| 5,104,558 A * | 4/1992 | Matsuzaki | C10M 135/00 | 508/220 |
| 5,120,410 A * | 6/1992 | Herdzina, Jr. | C25D 13/14 | 118/409 |
| 5,128,391 A * | 7/1992 | Shustack | C09D 4/06 | 522/33 |
| 5,201,436 A | 4/1993 | Owens et al. | | |
| 5,219,257 A * | 6/1993 | Koch | B21D 51/383 | 413/17 |
| 5,296,525 A * | 3/1994 | Spencer | C08F 299/026 | 523/407 |
| 5,464,885 A * | 11/1995 | Craun | C08F 283/00 | 523/423 |
| 5,532,297 A * | 7/1996 | Woo | C08F 287/00 | 523/406 |
| 5,714,532 A * | 2/1998 | Osterholtz | C08K 5/5435 | 524/114 |
| 5,739,215 A * | 4/1998 | Westerhof | C09D 167/00 | 525/438 |
| 5,770,290 A * | 6/1998 | McHenry | B21D 51/383 | 215/253 |
| 5,895,528 A * | 4/1999 | Gomariz Perez | B05B 13/0221 | 118/324 |
| 5,904,774 A * | 5/1999 | Gomariz Perez | B21D 51/46 | 118/323 |
| 5,927,536 A * | 7/1999 | Oyagi | B21D 51/383 | 220/266 |
| 6,028,162 A * | 2/2000 | Hahn | C09D 167/00 | 428/411.1 |
| 6,103,802 A * | 8/2000 | Zhang | C09D 151/003 | 523/101 |
| 6,165,266 A * | 12/2000 | Garcia | B05B 13/0221 | 118/305 |
| 6,306,934 B1 * | 10/2001 | Bode | C08F 290/144 | 523/409 |
| 6,425,721 B1 * | 7/2002 | Zysset | B21D 51/383 | 413/8 |
| 6,427,860 B1 * | 8/2002 | Nishida | B21D 51/383 | 220/269 |
| 6,428,261 B1 * | 8/2002 | Zysset | B21D 51/44 | 413/13 |
| 6,688,832 B1 * | 2/2004 | Zysset | B21D 51/383 | 413/12 |
| 6,730,168 B1 * | 5/2004 | Ross | B05C 5/0216 | 118/314 |
| 6,772,900 B2 * | 8/2004 | Turner | B65D 17/08 | 220/269 |
| 7,004,345 B2 * | 2/2006 | Turner | B21D 51/383 | 220/254.1 |
| 7,087,663 B2 * | 8/2006 | Feola | C08G 59/182 | 523/403 |
| 7,107,810 B2 * | 9/2006 | McClung | B21D 51/38 | 413/56 |
| 7,147,122 B2 * | 12/2006 | Heinicke | B21D 51/383 | 220/270 |
| 7,556,168 B2 * | 7/2009 | Turner | B65D 17/06 | 220/269 |
| 7,592,047 B2 * | 9/2009 | O'Brien | B65D 17/00 | 427/388.1 |
| 7,622,002 B2 * | 11/2009 | McEldowney | B05C 5/0216 | 118/306 |
| 7,644,833 B2 * | 1/2010 | Turner | B65D 17/08 | 220/269 |
| D638,704 S * | 5/2011 | Petlak | D9/435 | |
| 8,011,527 B2 * | 9/2011 | Forrest | B65D 17/08 | 220/610 |
| 8,173,265 B2 * | 5/2012 | O'Brien | B65D 17/00 | 428/457 |
| 8,875,936 B2 * | 11/2014 | Turner | B65D 17/165 | 220/619 |
| 8,973,780 B2 * | 3/2015 | Forrest | B65D 17/161 | 220/619 |
| 9,163,151 B2 * | 10/2015 | Lock | C09D 133/06 | |
| 2002/0005408 A1 * | 1/2002 | Yamasaki | B65D 17/165 | 220/269 |
| 2002/0102407 A1 * | 8/2002 | Huybrechts | C08G 59/4071 | 428/413 |
| 2002/0172760 A1 * | 11/2002 | An | B05B 13/0221 | 427/140 |
| 2007/0065608 A1 * | 3/2007 | Niederst | B05D 7/16 | 428/34.1 |
| 2007/0218196 A1 * | 9/2007 | McEldowney | B05C 5/0216 | 427/230 |
| 2009/0227705 A1 * | 9/2009 | Bochnik | C09D 5/024 | 523/122 |
| 2010/0136290 A1 * | 6/2010 | Biver | B29D 11/00865 | 428/142 |
| 2010/0266758 A1 * | 10/2010 | Vaes | C08G 18/003 | 427/140 |
| 2011/0171481 A1 * | 7/2011 | Kainz | C08J 3/05 | 428/480 |

(56) References Cited

U.S. PATENT DOCUMENTS

| | | | |
|---|---|---|---|
| 2011/0195263 A1* | 8/2011 | Malotky | C08J 3/05 |
| | | | 428/480 |
| 2012/0118785 A1* | 5/2012 | Kainz | B65D 25/14 |
| | | | 206/524.3 |
| 2012/0302690 A1* | 11/2012 | Cunningham | C08F 257/02 |
| | | | 524/460 |
| 2014/0030535 A1* | 1/2014 | Makotky | C08J 3/05 |
| | | | 428/480 |
| 2014/0323640 A1* | 10/2014 | Lock | C09D 133/06 |
| | | | 524/517 |
| 2014/0323641 A1* | 10/2014 | Lock | C09D 133/06 |
| | | | 524/517 |
| 2015/0376439 A1* | 12/2015 | Lock | C09D 133/02 |
| | | | 523/400 |

FOREIGN PATENT DOCUMENTS

| | | |
|---|---|---|
| EP | 1945453 | 7/2008 |
| MX | 2013007529 A | 6/2013 |
| RU | 51376 U1 | 2/2006 |
| WO | WO 99/51696 | 10/1999 |
| WO | 2005011880 A1 | 2/2005 |
| WO | 2006045017 A1 | 4/2006 |
| WO | WO 2009/025967 A1 | 2/2009 |

* cited by examiner

COATING COMPOSITION FOR A FOOD OR BEVERAGE CAN

The present invention relates to a coating composition. In particular, the present invention relates to a coating composition suitable for deposition onto a metal substrate and specifically a coating composition for repairing a coated metal substrate (such as repairing a score line) and to a method of repairing such a score line incorporating the use of the coating composition.

Metal containers are being equipped more and more with so-called easy open ends in which a user accesses the interior of the container by piercing the container in a predetermined manner, without the need for a separate opening device. Such easy open ends are routinely used in food and beverage cans.

The principle of easy opening is obtained by reducing the thickness of the metal to thereby provide a score line which is weaker and susceptible to opening. During the scoring operation, which is often achieved by stamping with a punch, the external varnish layer is cut and therefore the corrosion resistance of the metal substrate is compromised. This is particularly problematic in a context where:
  i) the metal has been stressed and therefore its resistance to corrosion is weakened
  ii) the tin layer of the tinplate (where this is the substrate) is also cut; and/or
  iii) the next treatment step of the packaging is sterilisation, where the presence of heat and high humidity will create high corrosion conditions
  iv) the container is at the beginning of its life cycle which has a minimum of two years.

The corrosion resistance of the metal substrate is restored by the application of a repair coating to the score line. This coating is often applied by spraying and in particular an airless spray process.

Current repair formulations are generally based on a cross-linkage of an epoxy resin, usually of low molecular weight, by poly(amido amine)s. These compositions are characterised by high volatile organic compounds (VOC), a low cross-linkage speed and a limited pot life (from a few hours to a week). Furthermore, since these compositions are based on epoxy chemistry, they often contain Bisphenol A (4,4'-(propane-2,2-diyl)diphenol, also known as BPA) or derivatives thereof.

Therefore, present compositions may have drawbacks. In particular, it is desired to provide such coatings that have a reduced amount of BPA or derivatives thereof.

Also it is desired to provide coatings with reduced levels of volatile organic content (VOC) when compared to the current compositions.

It is an object of embodiments of the present invention to provide a solution to the above mentioned or other problems.

According to a first aspect of the present invention there is provided a food or beverage can post repair coating composition comprising:
  an acrylic latex material.

Suitably, the acrylic latex material comprises an aqueous emulsion of one or more acrylic polymers.

Suitably, the acrylic latex material is formed from a reaction mixture, the reaction mixture may comprise one or more $C_1$ to $C_6$ alkyl (meth)acrylate material, suitably more than one $C_1$ to $C_6$ alkyl (meth)acrylate material. Examples of suitable $C_1$ to $C_6$ alkyl (meth)acrylate materials include methyl acrylate; methyl (meth)acrylate; ethyl acrylate; ethyl (meth)acrylate; propyl acrylate; propyl (meth)acrylate; butyl acrylate; butyl (meth)acrylate. The $C_1$ to $C_6$ alkyl (meth) acrylate may comprise one or more functional group, such as an epoxy group. For example the $C_1$ to $C_6$ alkyl (meth) acrylate may comprise glycidyl methacrylate.

The acrylic polymer(s) each suitably comprise a homopolymer or copolymer of at least one $C_1$ to $C_6$ alkyl (meth) acrylate monomer.

Unless stated otherwise, it should be understood that reference herein to (meth)acrylate indicates that the (meth) group is optional.

Suitably, the reaction mixture further comprises an $\alpha\beta$ ethylenically unsaturated carboxylic acid or anhydride. Particularly suitable $\alpha\beta$ ethylenically unsaturated carboxylic acid or anhydride are acrylic acid or methacrylic acid.

The reaction mixture may further comprise one or more ethylenically unsaturated monomer(s). In one embodiment, the reaction mixture may comprise an aryl substituted ethylenically unsaturated monomer, such as styrene, for example.

In one embodiment, the acrylic latex material comprises an aqueous dispersion of an acrylic material in a core/shell arrangement.

The shell may be formed from a plurality of components, which may be referred to as a shell mixture. The shell mixture suitably comprises one or more $\alpha\beta$ ethylenically unsaturated carboxylic acid such as methacrylic acid, for example. The shell mixture may further comprise one or more $C_1$ to $C_6$ alkyl (meth)acrylate, such as methyl acrylate, ethyl acrylate or butyl acrylate, a particularly suitable $C_1$ to $C_6$ alkyl (meth)acrylate is ethyl acrylate. The shell mixture may further comprise one or more ethylenically unsaturated monomer, such as an aryl substituted ethylenically unsaturated monomer, such as styrene, for example.

The shell mixture may further comprise one or more free radical initiators, particularly initiators which are soluble in the monomer mixture, such as a peroxy or peroxyester functional substances. Typical examples of suitable free radical initiators of this type include, tertiary butyl perbenzoate, tert butyl peroxy 3,5,5 trimethylhexanoate, tertiary butyl peroxy 2-ethyl hexanoate, di tertiary butyl peroxide and tertiary butyl per acetate. Other suitable initiator materials include azo type initiators, typical examples are 2,2'-azobis(isobutyronitrile), 2,2'-Azobis(2-methylbutyronitrile), 2,2'-Azobis(2.4-dimethyl valeronitrile) and 2,2'-Azobis(4-methoxy-2.4-dimethyl valeronitrile).

Suitably, the shell mixture is caused to undergo polymerisation to form a shell polymer. The polymerisation of the shell mixture is typically carried out as a free radical initiated solution polymerisation in a solvent or mixture of solvents. The solvents which may be used in this process include one or more of the following: alcohols such as n-butanol, pentanol or hexanol; or glycol ethers such as 2-butoxy ethanol, 1-methoxy propan-2-ol or dipropylene glycol mono methyl ether. Polymerisation may be carried out at an elevated temperature. Typically the polymerisation may be carried out in the range 80° C. to 150° C. The polymerisation can be effectively carried out by adding the shell mixture, over a set time period, to the solvent mixture. In one embodiment, the shell mixture may be caused to undergo polymerisation to form a shell polymer prior to contact with components of the core mixture.

Where the shell mixture comprises one or more $\alpha\beta$ ethylenically unsaturated carboxylic acid, the shell polymer will have pendant carboxylic acid functional groups. This may be referred to a carboxylic acid functional shell polymer.

The carboxylic acid functional shell polymer may be contacted with a base to form a water disperible salt. The carboxylic acid functionality in the carboxylic acid functional shell polymer may be at least partly neutralised with the base. Typically at least 10% of the available carboxylic acid groups are neutralised. In one embodiment, substantially all of the available carboxylic acid groups are neutralised by the base. Suitably, the base used for this neutralisation comprises an amine functional material, or a mixture of amine functional materials. Examples of suitable amine functional materials include ammonia, triethylamine, diethylamine, trimethylamine and morphline or hydroxy amine materials such as ethanol amine, N-methyl ethanol amine and N,N di methyl ethanolamine.

The shell polymer may be dispersed in aqueous medium. Suitably, the shell polymer may be dispersed in aqueous medium. In this manner, an aqueous dispersion or solution of the shell polymer may be formed.

In another embodiment, the shell mixture is caused to undergo polymerisation to form a shell polymer by dispersion polymerisation in an aqueous medium, thereby forming an aqueous dispersion or solution of the shell polymer.

The core may be formed from plurality of components, which may be referred to as a core mixture. Suitably, the core mixture comprises one or more $C_1$ to $C_6$ alkyl (meth) acrylate, such as one or more of methyl acrylate, ethyl acrylate or butyl acrylate, a particularly suitable $C_1$ to $C_6$ alkyl (meth)acrylate is ethyl acrylate. The core mixture may further comprise a functional $C_1$ to $C_6$ alkyl (meth)acrylate. For example, the $C_1$ to $C_6$ alkyl (meth)acrylate may comprise epoxy functionality, such as gylcidylmethacrylate; hydroxy functionality, such as either of hydroxy ethyl methacrylate or 2 hydroxy ethyl acrylate; or alkyl methylol functionality, such as n-butoxymethyl acrylamide. The core mixture may further comprise one or more ethylenically unsaturated monomer, such as an aryl substituted ethylenically unsaturated monomer, such as styrene, for example.

The polymer formed from the shell mixture, such as an aqueous dispersion thereof, may serve as a dispersant for a subsequent polymerisation, which may be a polymerisation of an $\alpha,\beta$ ethylenically unsaturated monomer mixture, such as the core mixture.

The core mixture may further comprise one or more free radical initiators, particularly suitable are initiators that are generally soluble in the monomer mixture, such as peroxy or peroxyester functional substances. Typical examples of free radical initiators of this type include, tertiary butyl perbenzoate, tert butyl peroxy 3,5,5 trimethylhexanoate, tertiary butyl peroxy 2-ethyl hexanoate, di tertiary butyl peroxide, and tertiary butyl per acetate. Other suitable oil soluble initiator materials include azo type initiators, such as: 2,2'-azobis(isobutyronitrile), 2,2'-Azobis(2-methylbutyronitrile), 2,2'-Azobis(2.4-dimethyl valeronitrile) and 2,2'-Azobis(4-methoxy-2.4-dimethyl valeronitrile). Free radical initiators which are water soluble may also be used such as, for example: azo type initiators such as 2,2'-Azobis[N-(2-carboxyethyl)-2-methylpropionamidine]hydrate, 2,2'-Azobis[2-(2-imidazolin-2-yl)propane]dihydrochloride and 2,2'-Azobis(2-methylpropionamidine)dihydrochloride. Other examples of suitable water soluble free radical initiators include materials such as hydrogen peroxide, tert butyl hydroperoxide or mixtures such as hydrogen peroxide and benzoin or the redox initiators such as the mixture tert-butyl hydroperoxide, erythrobic acid and ferrous complexes. Water soluble persulphate initiators such as ammonium persulphate, sodium persulphate or potassium persulphate can be used.

Suitably, the core mixture is caused to undergo polymerisation suitably at a temperature in the range of between about 30° C. to 99° C., particularly in the range of between about 50° C. to 95° C. and most suitably in the range of between about 80° C. to 90°. Polymerisation of the core mixture may occur in the presence of the polymer formed by polymerisation of the shell mixture to thereby form a core/shell polymer, typically by dispersion polymerisation. A typical polymerisation may be carried out by adding the core mixture, at a controlled rate over a period of time, to an aqueous dispersion of shell polymer, During the polymerisation the mixture may be mixed, such as by stirring and the temperature may be held generally constant.

Other methods to polymerise the core mixture include, but are not limited to, mixing all or part of the core ethylenically unsaturated substances with the aqueous dispersion of shell polymer and then adding the remaining core components, including free radical initiator, to the resulting mixture over a set period of time. Suitable temperatures for this type of process are typically in the range 50° C. to 95° C.

For the Core/Shell latex composition the ratio of the core mixture (monomers and initiator) to shell mixture (monomers and initiator) is typically between about 20:80 and 90:10 by weight. Suitably, the ratio of the core mixture to shell mixture is between about 60:40 and 80:20 by weight, particularly suitably the ratio of the core mixture to shell mixture components is between about 70:30 and 75:25.

In another embodiment the latex material comprises an aqueous dispersion of an acrylic material with reactive functional groups and stabilized with an emulsifier or surfactant material.

In such an embodiment, the emulsifier may be an anionic, cationic or non ionic type stabilizer. Typical examples of anionic emulsifiers include alkyl sulphates, such as sodium dodecyl sulphate or sodium polyoxy ethylene alkyl ether sulphate or aryl sulphonates such as sodium dodecylbenzene sulphonate. Other examples of anionic emulsifiers include the sulphosuccinates examples of which include the compounds sodium diisobutyl sulpho succinate, sodium dioctyl sulpho succinate and sodium di cyclohexyl sulpho succinate. Examples of nonionic emulsifiers include fatty alcohol ethoxylates such as poly ethylene glycol mono lauryl ether or fatty acid ethoxylates such as polyethylene glycol mono stearate or polyethylene glycol mono laurate or polyether block polymers such as polyethylene glycol/polypropylene glycol block polymers also known as pluronics, typical commercial products of this type include Tergitol XJ, XH or XD from Dow Chemical. Examples of Cationic emulsifiers include amine salts such as cetyl trimethyl ammonium chloride or benzyl dodecyl dimethyl ammonium bromide. It should also be noted that mixtures of anionic and cationic emulsifiers would not be desirable.

The acrylic latex material according to the present embodiment may be formed from a reaction mixture, the reaction mixture may comprise one or more $C_1$ to $C_6$ alkyl (meth)acrylate material, suitably more than one $C_1$ to $C_6$ alkyl (meth)acrylate material. Examples of suitable $C_1$ to $C_6$ alkyl (meth)acrylate materials include methyl acrylate; methyl (meth)acrylate; ethyl acrylate; ethyl (meth)acrylate; propyl acrylate; propyl (meth)acrylate; butyl acrylate; butyl (meth)acrylate. The $C_1$ to $C_6$ alkyl (meth)acrylate may comprise a functional $C_1$ to $C_6$ alkyl (meth)acrylate. For example, the $C_1$ to $C_6$ alkyl (meth)acrylate may comprise epoxy functionality, such as gylcidylmethacrylate; hydroxy functionality, such as either of hydroxy ethyl methacrylate or 2 hydroxy ethyl acrylate; or alkyl methylol functionality, such as n-butoxymethyl acrylamide.

In some cases the reaction mixture further comprises an αβ ethylenically unsaturated carboxylic acid or anhydride, preferably acrylic acid or methacrylic acid.

The reaction mixture may further comprise one or more ethylenically unsaturated monomer(s). In one embodiment, the reaction mixture may comprise an aryl substituted ethylenically unsaturated monomer, such as styrene.

The reaction mixture of α,β-ethylenically unsaturated compounds may be polymerised to form the acrylic latex using free radical initiators. Free radical initiators which are water soluble are commonly used in emulsifier stabilised Latex compositions as one or more of the free radical initiators for polymerization. Examples of this type of initiator include azo type initiators such as 2,2'-Azobis[N-(2-carboxyethyl)-2-methylpropionamidine]hydrate; 2,2'-Azobis[2-(2-imidazolin-2-yl)propane]dihydrochloride and 2,2'-Azobis(2-methylpropionamidine)dihydrochloride. Other examples of water soluble free radical initiators include materials such as hydrogen peroxide or mixtures such as hydrogen peroxide and benzoin or the redox initiators such as the mixture tert-butyl hydroperoxide, erythrobic acid and ferrous complexes. Water soluble persulphate initiators such as ammonium persulphate, sodium persulphate or potassium persulphate can be used.

In some polymerisations, initiators which are soluble in the monomer mixture or so called oil soluble initiators can be used, such as peroxy or peroxyester functional substances. Typical examples of free radical initiators of this type include, tertiary butyl perbenzoate, tert butyl peroxy 3,5,5 trimethylhexanoate, tertiary butyl peroxy 2-ethyl hexanoate, di tertiary butyl peroxide, and tertiary butyl per acetate. Other oil soluble initiator materials include azo type initiators, typical examples are 2,2'-azobis(isobutyronitrile), 2,2'-Azobis(2-methylbutyronitrile); 2,2'-Azobis(2.4-dimethyl valeronitrile) and 2,2'-Azobis(4-methoxy-2.4-dimethyl valeronitrile).

Polymerization may be carried out at temperatures in the range of between about 30° C. to 99° C., preferably in the range 50° C. to 95° C. and most preferably in the range 75° C. to 90° C. The temperature is typically held constant throughout the polymerization process.

The process of forming the emulsifier stabilised latex polymer can be achieved in a number of ways. In all cases the emulsifier is mixed with water and the mixture heated to the polymerisation temperature, as the first part of the process. In some process methods all of the monomer components can be mixed with water and emulsifier at the start of the process and then, when at temperature, the initiator materials can be added to the reaction mixture either continuously or in portions over a set time period. An alternative process is for all of the monomer mixture and the initiator mixture to be added to the mixture of emulsifier and water over a set time period at a constant rate. Other alternative process methods utilise a combination of these techniques, in so much as a part of the monomer mix or initiator (or both) is added to the emulsifier and water mixture at the start of polymerisation. The remaining monomer mix and initiator is then added to the reaction mixture over a set time period whilst maintaining a pre determined temperature. The appropriate process method which provides a stable latex material with the desired characteristics, from the chosen reaction components is utilised The term polymer as used herein refers to a homopolymer or copolymer unless otherwise stated. Furthermore, the term copolymer refers to a polymer formed from two or more different monomers. For example, the term copolymer as used herein refers to a polymer that may be formed from 2, 3, 4, 5 or more different monomers.

The coating composition is applied as a repair coating for component parts of food and beverage cans. A particularly preferred use is as a repair coating for a full aperture easy open end for food cans. This end component is repair coated, after fabrication, usually by airless spraying of the material on to the exterior of the score line. Other uses as repair coatings include the coating of seams and welds, such as side seams for which the coating may be applied to the area by spraying (airless or air driven) or roller coating. Repair coating can also include protection of vulnerable areas where corrosion may be likely due to damage, these areas include flanges, rims and bottom rims where the coating may be applied by spraying, roller coating flow or dip coating.

In certain embodiments, the coating compositions of the present invention, may be substantially free, may be essentially free and/or may be completely free of bisphenol A and derivatives or residues thereof, including bisphenol A ("BPA") and bisphenol A diglycidyl ether ("BADGE"). Such coating compositions are sometimes referred to as "BPA non intent" because BPA, including derivatives or residues thereof, are not intentionally added but may be present in trace amounts because of impurities or unavoidable contamination from the environment. The coating compositions can also be substantially free and may be essentially free and/or may be completely free of bisphenol F and derivatives or residues thereof, including bisphenol F and bisphenol F diglycidyl ether ("BFDGE"). The term "substantially free" as used in this context means the coating compositions contain less than 1000 parts per million (ppm), "essentially free" means less than 100 ppm and "completely free" means less than 20 parts per billion (ppb) of any of the above mentioned compounds, derivatives or residues thereof.

The coating composition may further comprise one or more wetting agent, such as a non silicone wetting agent, for example.

The coating composition may further comprise one or more defoamer, such as a silicone defoamer, for example.

The coating composition may further comprise further additives, such as, for example, one or more alcohol component, one or more ether component etc. In one embodiment, the coating composition may further comprise butylglycol.

According to a second aspect of the present invention there is provided a food or beverage can comprising a surface having a coating on at least a portion thereof, the coating being formed from a coating composition according to the first aspect.

In particular, the second aspect of the present invention suitably provides a food or beverage can having one or more score line, at least a portion of the or each score line having a coating thereon, the coating being formed from a coating composition of the first aspect.

According to a third aspect of the present invention there is provided a method of repairing a food or beverage can, the method comprising coating a portion of the food or beverage can with a coating composition according to the first aspect.

Use of a coating composition according to the first aspect in repairing a food or beverage can by coating a portion of the food or beverage can with a coating composition according to the first aspect.

It has been surprisingly and advantageously found by the present inventors that the coating composition of the present invention provides a very clear coating with no perceptible yellowing of the coating. This is extremely advantageous in that the coating composition, which is often used to repair a score line, is substantially not visible to an end user. Therefore, according to a further aspect of the present invention there is provided the use of a coating composition according to the first aspect for reducing yellowing.

All of the features contained herein may be combined with any of the above aspects and in any combination.

For a better understanding of the invention, and to show how embodiments of the same may be carried into effect, reference will now be made, by way of example, to the following experimental data.

EXAMPLES

The following examples are intended to illustrate the invention and should not be construed as limiting the invention in any way.

Polymer Examples

Core/shell latex emulsions were formed as follows.

Shell Polymer Example 1

The ingredients of this shell polymer example are displayed in Table 1 below.

TABLE 1

| Item no | Component | Parts (by weight) |
|---------|-----------|-------------------|
| 1 | Propylene glycol mono methyl ether | 6.00 |
| 2 | Butyl glycol | 11.88 |
| 3 | Trigonox 42S* | 0.50 |
| 4 | Butyl glycol | 3.00 |
| 5 | Methacrylic acid | 11.25 |
| 6 | Ethyl acrylate | 6.25 |
| 7 | Styrene | 7.50 |
| 8 | Butylglycol | 1.00 |
| 9 | Trigonox 42S* | 0.25 |
| 10 | Butyl glycol | 1.50 |
| 11 | Butyl glycol | 0.50 |
| 12 | De-ionized water | 5.83 |
| 13 | Dimethylethanolamine** | 5.83 |
| 14 | De-ionized water | 38.73 |

*= tert-Butyl peroxy-3,5,5-trimethylhexanoate
**= the amine used to neutralise the polymer Process Method The polymerisation was carried out using a reaction vessel equipped with heating, cooling, stirring and a reflux condenser. A sparge of nitrogen was applied to the reactor to provide an inert atmosphere, stirred vessels for mixing and addition of monomers (a monomer tank) and free radical initiators (an initiator tank) were available and linked to the reaction vessel by pumps which could be used to control the addition rate. Items 1 and 2 were added to the reaction vessel and heated to 140° C. Whilst the vessel was heating to temperature items 3 and 4 were mixed in the initiator tank and items 5, 6 and 7 were mixed in the monomer tank. With the contents of the reactor maintained at a temperature of 139 to 140° C. the contents of the initiator tank and monomer tank were simultaneously added to the reactor at a constant rate over a period of 150 minutes. After the addition was completed the contents of the reactor were held at 139 to 140° C., then item 8 was added to the reactor from the monomer tank as a line wash. Items 9 and 10 were added to the initiator tank. After holding the reactor contents at 139-140° C. for 30 minutes 50% of the contents of the initiator tank (items 9 and 10) were added as rapidly as possible to the reactor and the temperature of the reactor held at 139 to 140° C. for a further 30 minutes. The remaining contents of the initiator tank were then added and item 11 added to the reactor via the initiator tank as a line wash. The contents of the reactor were then maintained at 139 to 140° C. for a further 90 minutes. The reactor contents were then cooled to 98° C., items 12 and 13 were mixed and the mixture was carefully added to the reactor over a period of 15 minutes. After thorough mixing of the contents of the reactor item 14 was added to produce a translucent or slightly hazy solution like material which was cooled to 25° C. and filtered ready for use in further polymerisation.

The polymer obtained by the above example had the following characteristics:
  solids content 28.9% (180° C., 30 minutes 0.5 gm)
  viscosity 504 centipoise (Brookfield DVII pro viscometer spindle 3, 50 rpm @ 25° C.)
  acid value 69.6 (mgKOH/gm on total sample)

This Shell polymer, also sometimes referred to as soap, can be used in various core/shell latex systems. One example is detailed in table 2.

Latex Example 1

TABLE 2

| Item | Component | Parts (by weight) |
|------|-----------|-------------------|
| 1 | Shell polymer example 1 [1] | 25.38 |
| 2 | De-ionized water | 55.02 |
| 3 | Styrene | 6.80 |
| 4 | Ethyl acrylate | 9.54 |
| 5 | Glycidyl methacrylate | 1.32 |
| 6 | Trigonox 21[2] | 0.18 |
| 7 | De-ionized water | 1.68 |
| 8 | Trigonox 21[2] | 0.04 |
| 9 | Trigonox 21[2] | 0.04 |

[1] = the soap formed from the reaction components in Table 1, above
[2] = the radical initiator = tert-Butyl peroxy-2-ethylhexanoate Process Method Items 1 and 2 were placed in a reaction vessel equipped with heating, cooling, stirring and a simple reflux condenser. The vessel was also supplied with a nitrogen sparge to maintain an inert atmosphere and also attached were stirred addition tanks which could be employed to add αβ unsaturated monomers and initiator. The mixture in the reaction vessel was heated to 85° C. and held at that temperature. Items 3 to 6 were mixed in a stirred addition tank and then added to the vessel over a period of 2 hours, whilst maintaining the temperature of the contents of the vessel at 85° C. After the addition was complete item 7 was added to the vessel via the stirrer addition tank as a line wash. The vessel was maintained at 85° C. for 30 minutes and then item 8 was added. The vessel was maintained at temperature for a further 1 hour before item 9 was added and the vessel was then maintained at 85° C. for a further 2 hours. Finally the contents of the vessel were cooled to 40 C and discharged with filtration prior to the use of this material, Latex example 1, in the preparation of coatings.

The characteristics of the Latex produced in Latex example 1 were determined as follows:
  Solids content 25.4% (110° C., 60 minutes 0.5 gm)
  Viscosity 15 seconds (Ford 4 cup @25° C.)
  Particle size 167.4 nanometers (Z average value, determined with diluted sample using Malvern Zetasizer Nano ZS machine)

The latex produced in this process is an example of a core shell latex dispersion, with a ratio of core to shell components of 73.3/26.7 wt %.

Coatings Examples

Coating examples 1 and 2 were formed from components as listed in Table 3, below.

TABLE 3

| Components | Coating example 1 | Coating example 2 |
|---|---|---|
| AC-25381[1] | 75.9 | |
| Latex example 1[2] | | 91 |
| Desionised Water | 21.8 | 6.9 |
| Additive solution 1 | 1.6 | 1.6 |
| Additive solution 2 | 0.4 | 0.4 |
| Additive solution 3 | 0.3 | 0.3 |

[1]= Aqueous, core-shell, fine disperse copolymer, self-crosslinking acrylic dispersion, commercially available from Alberdingk Boley GMBH, Krefeld Germany
[2]= Core shell Latex formed as above Additives solutions are prepared as describes below in Table 4:

TABLE 4

| | Additive solution 1 | Additive solution 2 | Additive solution 3 |
|---|---|---|---|
| Byk-381[6] | 25 | | |
| Byk-028[7] | | 50 | |
| Tinopal NFW liq[8] | | | 10 |
| Desionised water | | 50 | 90 |
| Butylglycol | 75 | | |

[6]= Non silicone wetting agent, commercially available from BYK-Chemie GmbH, Wesel, Germany
[7]= Silicone defoamer, commercially available from BYK-Chemie GmbH, Wesel, Germany
[8]= Tinopal NFW Liq commercially available from BASF SE, Ludwigshafen, Germany Each additive solution is made by adding the components in order, as in the table 4, to a vessel stirred with a high speed mixer at 25° C. Mixing was continued for 10 minutes after the addition of components was complete.

Each of the coating examples was made by adding the components in order, as in the table 4, to a vessel stirred with a high speed mixer at 25° C. Mixing was continued for 10 minutes after the addition of components was complete.

After mixing each of the coatings was ready for use.

Coating Application and Drying

The coatings from the examples outlined above were applied to full aperture tinplate easy open ends. The ends used were coated with clear or gold or white pigmented lacquer with print markings and had not been repair coated.

The coatings were applied with an airless spray gun in a strip 5-25 mm wide over the score line on the easy open end.

After application of the coatings the easy open ends were dried for one minute in a fan assisted oven at a temperature between 100° C. and 175° C. as outlined in table 4 below. The drying process produces a cured film of the coating on the end which is tested, as outlined in the details below, to demonstrate the performance of the protective coating applied to the score line as a repair layer.

Details of Methods for Testing Coatings

Coating performances are evaluated using tests for bubbles, corrosion, blush, adhesion and yellowing. Details of how these tests are performed and evaluated are given below.

Bubbles

After application and curing, bubbles formation is evaluated. This is done by examining the score line with a microscope looking particularly for bubbles and defects which are trapped within the film or in the coating. The evaluation is rated between 0 and 5. Rating grade 0 corresponds to no bubbles seen along the score line and grade 5 corresponds to bubbles covering all of the score line.

Corrosion

The corrosion performance is evaluated after dipping ends in acidified copper sulphate solution for 5 minutes at room temperature.

The acidified Copper sulphate solution composition is, in parts by weight:

| | |
|---|---|
| Copper sulphate (hexa-hydrate) | 200 |
| Sodium chloride | 15 |
| Concentrated hydrochloric acid | 2 |
| Water | 1000 |

The evaluation is rated between 0 and 5. Grade 0 corresponds to a corrosion free score line with no deposit of copper from the solution. Grade 5 corresponds to a fully corroded score line which is completely marked with a copper deposit.

Blush

To assess the resistance the coated ends are sterilised in an autoclave for 1 hour at 130° C. in water and the film is observed. Some phenomena are possible: adhesion loss, corrosion and blush. Blush is white colouration of the film caused by water penetration and entrapment.

In the evaluation of the coating examples in table 5 reported below the blush evaluation corresponds to sterilisation in the liquid phase (completely immersed in the solution) and vapour phase in water for 1 hour at 130° C.

In the evaluation of the coating examples in Table 6 reported below the blush evaluation corresponds to sterilisation in the liquid phase (completely immersed in the solution) in water with 1% arylsulphosuccinate detergent for 1 hour at 130° C.

The industrial process for processing or sterilisation of cans containing various food stuffs often uses water which is treated with detergents such as arylsulphosuccinates. In some cases the industrial process can also use a 1% solution of Teepol in water. Hence, this test has particular relevance to the industrial use of the coatings that are under evaluation.

After sterilisation the appearance of the film is rated between 0 and 5. Grade 0 corresponds to perfect film appearance with no discernible attack. Grade 5 corresponds to complete attack of the film across the whole of the score line.

Adhesion

Film adhesion after sterilisation in water or in water plus 1% teepol for 1 hour at 130° C. is also checked. The coating is crosshatched and checked for removal with tape (3M 610 type tape). Grade 0 corresponds to good adhesion with no removal of coating and grade 5 to complete loss of adhesion as seen by complete removal of the coating with the tape.

Yellowing

To check yellowing the coating is applied on ends which are coated with white enamel and sterilized in water or in water plus 1% teepol for 1 hour at 130° C. Grade 0 corresponds to no yellowing and grade 5 to a high yellowing level.

Results of Testing of Coating Examples

The standard product and coating examples were prepared, applied and dried as outlined in the preceding descriptions. The coated ends obtained were then tested no later than 3 hours after completion of the drying process. The results of the testing and evaluation of the ends are compiled in Tables 5, 6, 7 and 8, below.

TABLE 5

Yellowing results in water

|  | Film curing temperature | Yellowing |
|---|---|---|
| Standard from PPG (epoxy based solvent-borne product)[1] | 125° C. | 1 |
|  | 150° C. | 1 |
|  | 175° C. | 2 |
| Coating Example 1 | 125° C. | 0 |
|  | 150° C. | 0 |
|  | 175° C. | 0 |
| Coating Example 2 | 125° C. | 0 |
|  | 150° C. | 0 |
|  | 175° C. | 0 |

[1]= PPG 2982-803/A + PPG 2982-804/A mix 1:1

TABLE 6

Results in water

|  | Film curing temperature | Corrosion | Blush in liquid phase | Blush in vapour phase | Adhesion after sterilisation |
|---|---|---|---|---|---|
| Standard from PPG (epoxy based solvent-borne product)[1] | 175° C. | 0 | 0 | 0 | 0 |
| Coating Example 2 | 175° C. | 0 | 0 | 0 | 0 |

[1]= PPG 2982-803/A + PPG 2982-804/A mix 1:1

As shown in Table 6, product performances are excellent. So, as shown in Table 6, the coating of example 2 according to the invention performs very well and shows improved yellowing over the comparative example.

In all of the examples according to the invention, the film is transparent and is colourless, as indicated by a score of 0 in the yellowing test, whereas the standard is known to be slightly yellowish, as indicated by a score of 1 and 2 in the yellowing test, giving the repair some visibility. Hence, the coatings of the invention offer another desirable advantage over the current commercial standard product, particularly where the ends are precoated with a pigmented white coating or colourless lacquer.

Furthermore, the coatings according to the invention are free from BPA, which is particularly advantageous.

TABLE 7

Yellowing results in Teepol

|  | Film curing temperature | Yellowing |
|---|---|---|
| Standard from PPG (epoxy based solvent-borne product)[1] | 125° C. | 1 |
|  | 150° C. | 1 |
|  | 175° C. | 2 |
| Coating Example 1 | 125° C. | 0 |
|  | 150° C. | 0 |
|  | 175° C. | 0 |
| Coating Example 2 | 125° C. | 0 |
|  | 150° C. | 0 |
|  | 175° C. | 0 |

TABLE 8

Results in Teepol

|  | Film curing temperature | Corrosion | Blush in liquid phase | Blush in vapour phase | Adhesion after sterilisation |
|---|---|---|---|---|---|
| Standard from PPG (epoxy based solvent-borne product)[1] | 175° C. | 0 | 0 | 0 | 0 |
| Coating Example 2 | 175° C. | 0 | 0 | 0 | 0 |

Tables 7 and 8 describe results after sterilisation in water plus 1% teepol (sodium dodecyl benzene sulphonate, detergent) for 1 h at 130° C.

Again, it can be seen that the results in terms of yellowing are improved in the coatings according to the invention. Furthermore, as shown in Table 8, the coating performs exceptionally well against the standard in all other areas. Thus in summary, it can be seen from the examples above that a coating composition made in accordance with the present invention performs very well and shows improvements in terms of yellowing. Furthermore, as discussed above, the coatings according to the invention do not contain BPA, which is particularly advantageous.

Furthermore, a coating according to the present invention provides a water based coating with lower volatile organic content (VOC), which does not need to be stored (or aged) to produce the desired protection performance and produces less yellowing compared to the current commercial standard product. Furthermore it can be seen from the examples presented that in common with the current commercial standard product the coating composition made in accordance with the present invention provides a coating can be applied with airless spray equipment and provides sufficient protection to resist corrosion to the exposed metal score line which it has been applied to repair.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A food or beverage can comprising a varnish layer, a score line, and a repair coating applied to at least a portion of the score line, wherein the repair coating comprises an acrylic latex material.

2. A method of repairing a score line on a food or beverage can, the method comprising applying to the score line repair coating composition, the repair coating composition comprising an acrylic latex material.

3. A can according to claim 1, wherein the acrylic latex material comprises an aqueous emulsion of one or more acrylic polymers.

4. A can according to claim 1, wherein the acrylic latex material comprises an aqueous dispersion of an acrylic material in a core/shell arrangement.

5. A can according to claim 4, wherein the core is formed from a core mixture and the shell is formed from a shell mixture, and wherein the ratio of the core mixture (monomers and initiator) to shell mixture (monomers and initiator) is 20:80 to 90:10 by weight.

6. A can according to claim 4, wherein the acrylic latex material comprises an aqueous dispersion of an acrylic material with reactive functional groups and stabilized with an emulsifier or surfactant material.

7. A can according to claim 1, wherein the coating composition is substantially free of bisphenol A and derivatives or residues thereof.

8. A method according to claim 2, wherein the coating composition is substantially free of bisphenol A and derivatives or residues thereof.

9. The food or beverage can of claim 1, wherein the acrylic latex material cures upon drying and/or heating.

10. The method of claim 2, wherein the acrylic latex material cures upon drying and/or heating.

* * * * *